United States Patent

Pettersson

[15] 3,660,845

[45] May 2, 1972

[54] RADAR UNIT ARRANGEMENT FOR DETERMINING IN RECEIVED ECHO PULSES THE POSITION OF THE PULSE CENTER AND THE PULSE DURATION

[72] Inventor: George Gustaf Lennart Pettersson, Skalby, Sweden

[73] Assignee: Telefonaktiebolaget LM Ericsson, Stockholm, Sweden

[22] Filed: Jan. 5, 1970

[21] Appl. No.: 619

[30] Foreign Application Priority Data

Feb. 26, 1969 Sweden..................................2589/69

[52] U.S. Cl............................343/17.1 R, 343/5 DP, 343/7.3
[51] Int. Cl.........................................................G01s 7/28
[58] Field of Search..................................343/5 DP, 7.3, 17.1

[56] References Cited

UNITED STATES PATENTS 3,004,707  10/1961  Wilson....................................343/5 X
3,181,145  4/1965  Towle et al......................343/5 DP UX
3,264,645  8/1966  Hotz.......................................343/17.1
3,403,396  9/1968  Van Popta et al..............343/5 DP UX

*Primary Examiner*—T. H. Tubbesing
*Attorney*—Hane & Baxley

[57] ABSTRACT

A radar unit arrangement for determining the position of the pulse center and the pulse duration of the received echo pulses. The echo pulses gate a number of subpulses to a first binary up-down counter which counts the subpulses. A second binary up-down counter receives a pulse from the first each time a certain value is exceeded. A third binary counter indicates the time elapsed from the moment of the emitting a radar pulse. The contents of the second and the third binary counter are continuously compared in a comparator which each time equality is obtained activates a bistable circuit. The first and the second binary counters are controlled by the bistable circuit so as to switch the counting direction of the counter in such a way that the number of subpulses before and after the change of state of the bistable circuit will be the same.

3 Claims, 1 Drawing Figure

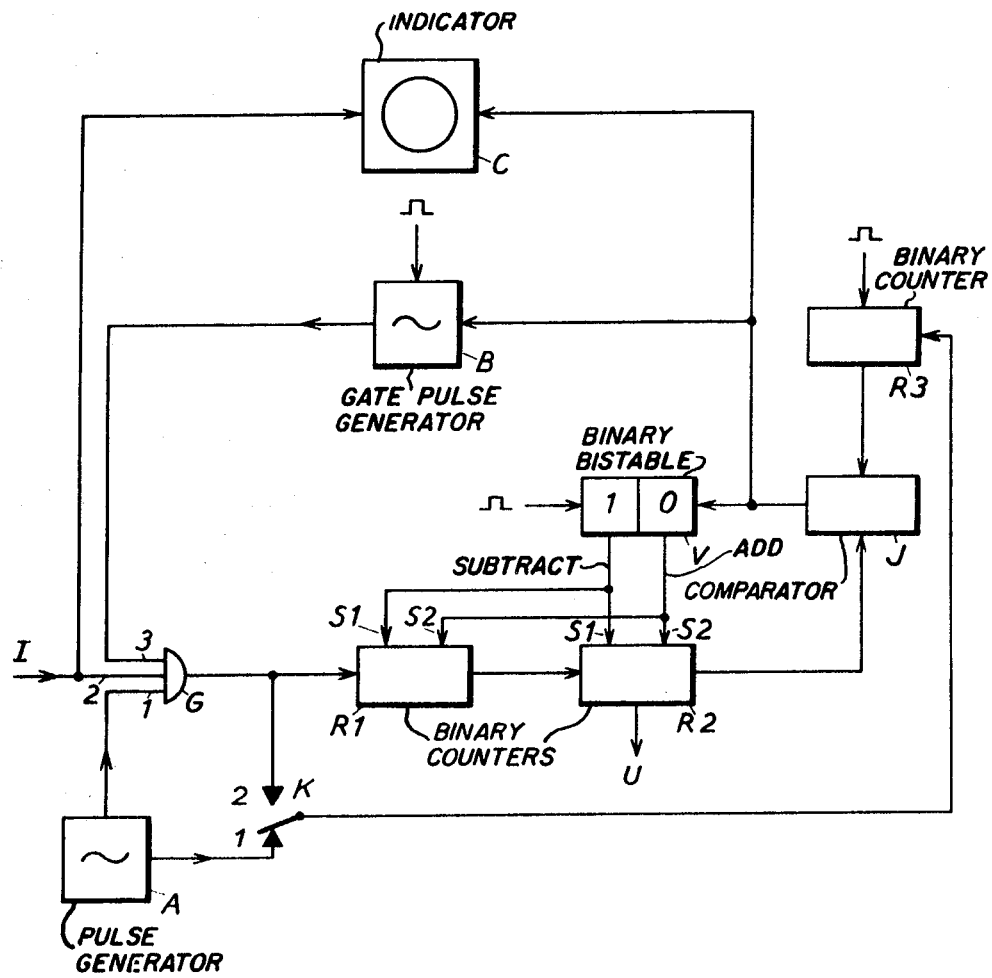

RADAR UNIT ARRANGEMENT FOR DETERMINING IN RECEIVED ECHO PULSES THE POSITION OF THE PULSE CENTER AND THE PULSE DURATION

This invention concerns a radar unit arrangement for determining the parameters of received echo pulses; the position of the pulse center and the pulse duration. An object of the invention is to provide an arrangement that is simpler and less expensive than earlier known arrangements.

An embodiment of the invention will be described more fully with reference to the accompanying drawing whose sole FIGURE is a circuit diagram of apparatus according to the invention.

Received echo pulses are transmitted via the inlet I of the arrangement to an inlet 2 of a gate circuit G. Another inlet 1 of gate circuit G is connected to a pulse generator A which opens the gate circuit concurrently with the pulses. The gate circuit has a further inlet 3 whose function is hereinafter explained below but for the present is temporarily assumed to control the state of the gate circuit so that the gate circuit transmits a signal, consisting of a number of subpulses corresponding to the duration of the echo pulse. These subpulses are supplied to a first binary counter R1 which has one outlet connected to another binary counter R2. Each time the counter R1 exceeds its maximum absolute value in either the upward or downward direction, a pulse is supplied to the counter R2. Both counters are controllable in such a way that their contents upon the reception of pulses are decreased and increased respectively, i.e., the counters are controlled up-down counters. This is indicated by means of two control inlets S1 and S2. A signal on inlet S1 controls substraction, while a signal on inlet S2 controls addition. The contents from the counter R2 are fed continuously to one side of a comparator circuit J which performs a continuous comparison with the contents of a third counter R3 fed to the other side of the comparator. According to the example the counter R3 is stepped forward in two different manners dependent on the position into which a make-and-break contact indicated by K, is set. In the following it is temporarily assumed that the contact 1 is closed. The control of the contact can be manual or electronic by means (not shown). In this position the first of said parameters is determined: the position of the center in the scan of the received echo pulses. The counter R3 is stepped forward by the pulse generator A starting from the sending out of the radar pulse, so that its contents indicate the number of pulse periods from the beginning of the scan. In each scan coincidence is found at some moment between the contents of the counters R2 and R3 and when this takes place, a pulse is supplied from the comparator circuit J to a binary bistable circuit V. When sending out the radar pulse, i.e. at the beginning of each scan, the 1-outlet of the bistable circuit is activated, whereby the earlier mentioned control inlet S1 is activated, so that each received pulse will reduce the contents of the counters R1 and R2. When the bistable circuit V receives the pulse from the comparator J, the O-outlet of the bistable circuit is activated so that now the control inlet S2 is activated and each received pulse will increase the contents of the counters R1 and R2.

During each scan there is consequently a time of change-over at which the bistable circuit reverses, switching the pulse counters from a decreasing condition into an increasing condition. This implies that the subpulses that are present before the time of change-over of the counter R1, are subtracted from, and the pulses that are present after the time of change-over are added to the contents of the counter. A state of equilibrium occurs when the number of subpulses recorded in the counter R1 during a scan before and after the time of change-over are identical, i.e. when the time of change-over occurs in the centre of the echo pulse trains.

The echo pulses received via the inlet I are also supplied to an indicator C which also receives pulses from the comparator circuit J whereby the received echo pulses are reproduced on the indicator screen together with a strobe pulse, whose position is dependent on the time of change-over. The output pulses from the comparator circuit J also control a gate pulse generator B. Gate pulse generator B limits the parameter determination to a range gate that constitutes a certain constant fraction of the whole scan, in such a way that the center of the range gate follows the center of the echo pulses. This can in principle, for example, occur in such a way that a time delay $t$ between the synchronizing pulse and the control pulse from the comparator circuit of the preceding synchronizing period decreases by half the width $b$ of the range gate, so that the range gate opens at $t - \frac{1}{2} b$ units of time after the succeeding synchronizing pulse and closes at $t + \frac{1}{2} b$ units of time after said synchronizing pulse. The output signal from the gate pulse generator B is supplied to the inlet 3 of the gate circuit G, limiting in this way the number of subpulses.

With the contact K in position 2 the second of said parameters is determined, i.e., the average value of the pulse duration of the received echo pulses. In contrast to the example described above the counter R3 now starts counting the number of pulse periods not until the first subpulse is transmitted from the gate circuit G, and then counts in the same way as the counter R1 the number of subpulses. Otherwise the arrangement functions in the same way as has been described above. This implies that the change-over of the bistable circuit V now takes place when the contents of the counter R2 indicate half the value of the received echo pulse duration, and a doubling of the setting of the counter R2 thus gives the result of the searched pulse duration .

I claim:

1. A radar unit arrangement for determining at least one of the two parameters of received echo pulses, namely the position of the center of an echo pulse and the duration of the echo pulse, said arrangement comprising: a pulse generator for generating a sequence of subpulses; an AND-gate circuit having a first inlet for receiving the echo pulses, a second inlet connected to said pulse generator and an outlet so that when an echo pulse is received at said one inlet a number of subpulses are transmitted from said outlet; a first pulse counter having a counting inlet connected to the outlet of said AND-gate circuit, a control input means for controlling said pulse counter to up count or down count, and an overflow outlet which emits a pulse each time the absolute value of the count in said counter exceeds predetermined values, a second pulse counter having a counting inlet connected to the overflow outlet of said fist counter, a control input means for controlling said pulse counter to up count or down count, and an outlet means for transmitting signals representing the instantaneous value of the count in said counter; a third pulse counter having an inlet for for receiving said subpulses, and an outlet means for transmitting signals representing the instantaneous value of the count in said counter to indicate the elapsed time from a given instant of time; a comparator means having inlets connected to the outlets of said second and third pulse counters and an outlet for emitting a pulse whenever an equality is sensed; a bistable circuit having a first inlet adapted to receive a pulse at the start of each radar scan to switch said bistable circuit to a first state, a second inlet connected to the outlet of said comparator means to switch said bistable circuit to a second state and outlet means connected to the control input means of said first and second pulse counters so that when said bistable means is in said first state said counters down count and when in said second state said counters up count whereby the number of subpulse occuring before and after each switching of said bistable circuit approaches an equality.

2. The arrangement according to claim 1 wherein the inlet of said third pulse counter is connected directly to said pulse generator.

3. The arrangement according to claim 1 wherein the inlet of said third pulse counter is connected to the outlet of said AND-gate circuit.

* * * * *